(12) United States Patent
Ogura

(10) Patent No.: US 10,473,350 B2
(45) Date of Patent: Nov. 12, 2019

(54) AIR-CONDITIONING SYSTEM

(71) Applicant: Mitsubishi Electric Corporation, Tokyo (JP)

(72) Inventor: Kazutaka Ogura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 374 days.

(21) Appl. No.: 15/321,773

(22) PCT Filed: Sep. 26, 2014

(86) PCT No.: PCT/JP2014/075738
§ 371 (c)(1),
(2) Date: Dec. 23, 2016

(87) PCT Pub. No.: WO2016/046986
PCT Pub. Date: Mar. 31, 2016

(65) Prior Publication Data
US 2017/0153034 A1 Jun. 1, 2017

(51) Int. Cl.
| F24F 11/00 | (2018.01) |
|---|---|
| G05B 19/042 | (2006.01) |
| F24F 11/30 | (2018.01) |
| F24F 11/89 | (2018.01) |
| F24F 11/62 | (2018.01) |
| G06Q 50/06 | (2012.01) |

(Continued)

(52) U.S. Cl.
CPC .............. *F24F 11/30* (2018.01); *F24F 11/62* (2018.01); *F24F 11/89* (2018.01); *G05B 19/042* (2013.01);
(Continued)

(58) Field of Classification Search
CPC .. F24F 11/30; F24F 11/62; F24F 11/89; F24F 11/54; F24F 11/64; F24F 2140/60; G06Q 50/06; G05B 19/042; G05B 2219/2614
(Continued)

(56) References Cited

U.S. PATENT DOCUMENTS

2006/0261780 A1* 11/2006 Edington .............. H01M 10/48
320/130
2008/0169907 A1* 7/2008 Ootsuka ................. G08C 17/02
340/10.1
(Continued)

FOREIGN PATENT DOCUMENTS

| JP | 62-200127 A | 9/1987 |
|---|---|---|
| JP | 10-150457 A | 6/1998 |

(Continued)

OTHER PUBLICATIONS

JP2000234792 Translation from Espacenet (Year: 2000).*
(Continued)

*Primary Examiner* — Chun Cao
(74) *Attorney, Agent, or Firm* — Posz Law Group, PLC

(57) ABSTRACT

A plurality of central controllers that each control a refrigeration cycle device and receive power consumption data of the refrigeration cycle device and a central management device that performs pro-rata calculation by use of at least the power consumption data and manages the plurality of central controllers are provided. The central management device includes a first data unit that stores the power consumption data and a result of the pro-rata calculation and a second data unit that stores data output from each of the plurality of central controllers, and the plurality of central controllers each include a third data unit that stores operation data of the refrigeration cycle device and a fourth data unit that stores data of the first data unit output from the central management device.

10 Claims, 8 Drawing Sheets

(51) Int. Cl.
*F24F 140/60* (2018.01)
*F24F 11/64* (2018.01)
*F24F 11/54* (2018.01)

(52) U.S. Cl.
CPC .............. *G06Q 50/06* (2013.01); *F24F 11/54* (2018.01); *F24F 11/64* (2018.01); *F24F 2140/60* (2018.01); *G05B 2219/2614* (2013.01); *G05B 2219/2639* (2013.01)

(58) Field of Classification Search
USPC ................................................ 700/276, 278
See application file for complete search history.

(56) References Cited

U.S. PATENT DOCUMENTS

| | | | | |
|---|---|---|---|---|
| 2010/0281246 A1* | 11/2010 | Bristow | .............. | G06F 11/1425 713/100 |
| 2012/0109665 A1* | 5/2012 | Knutson | ................ | G06Q 10/08 705/1.1 |
| 2012/0221813 A1* | 8/2012 | Inoue | .................. | G06F 11/2064 711/162 |
| 2015/0137997 A1* | 5/2015 | Huang | .................. | A61B 5/1112 340/870.09 |

FOREIGN PATENT DOCUMENTS

| | | | | |
|---|---|---|---|---|
| JP | 2000-234792 A | | 8/2000 | |
| JP | 2000234792 | * | 8/2000 | .............. F24F 11/02 |
| JP | 2001-141290 A | | 5/2001 | |
| JP | 2004-020130 A | | 1/2004 | |

OTHER PUBLICATIONS

International Search Report of the International Searching Authority dated Dec. 22, 2014 for the corresponding international application No. PCT/JP2014/075738 (and English translation).

\* cited by examiner

AIR-CONDITIONING SYSTEM

CROSS REFERENCE TO RELATED APPLICATION

This application is a U.S. national stage application of PCT/JP2014/075738 filed on Sep. 26, 2014, the contents of which are incorporated herein by reference.

TECHNICAL FIELD

The present invention relates to an air-conditioning system.

BACKGROUND ART

An air-conditioning system that includes a plurality of central controllers controlling a plurality of air-conditioning appliances and also includes a central management device that controls the plurality of central controllers is proposed (for example, refer to Patent Literature 1). In the air-conditioning system described in Patent Literature 1, the central controller includes a storage unit that stores collected data of air-conditioning appliances (operation data), and when the number of times of collection reaches a predetermined number, the central controller outputs the operation data to the central management device side.

CITATION LIST

Patent Literature

Patent Literature 1: Japanese Unexamined Patent Application Publication No. 2004-20130 (for example, paragraphs 0034 and 0035, and FIGS. 2 and 12)

SUMMARY OF INVENTION

Technical Problem

In the air-conditioning system described in Patent Literature 1, as the operation data collected in the central controller side is output to the central management device side, the operation data on the central controller side can be backed up. However, the system does not back up the data of a side of the central management device, which is a master unit, on a side of the central controller, which is a slave unit, and therefore, in some cases, data held by the master unit side is lost due to malfunction or other causes of the master unit. In other words, in the air-conditioning system described in Patent Literature 1, in some cases, the data held by the central management device is lost and cannot be restored.

For example, in a multi-air-conditioning apparatus for a building, users using the air-conditioning appliance are different from floor to floor in some cases. In these cases, data accumulated in a master unit is used for billing each user. However, when the data is lost in the master unit and cannot be restored, a charge cannot be imposed on the users, and therefore convenience is impaired.

An embodiment of the present invention has been made to solve the above problem, and has an object to provide an air-conditioning system capable of offering convenience prevented from being impaired due to data loss.

Solution to Problem

An air-conditioning system according to an embodiment of the present invention includes a plurality of central controllers that each control a refrigeration cycle device and receive power consumption data of the refrigeration cycle device and a central management device that performs pro-rata calculation by use of at least the power consumption data and manages the plurality of central controllers. The central management device includes a first data unit that stores the power consumption data and a result of the pro-rata calculation and a second data unit that stores data output from each of the plurality of central controllers. The plurality of central controllers each include a third data unit that stores operation data of the refrigeration cycle device and a fourth data unit that stores data of the first data unit output from the central management device.

Advantageous Effects of Invention

In the air-conditioning system according to the embodiment of the present invention, the above configuration is capable of preventing impairment of convenience due to data loss.

DESCRIPTION OF EMBODIMENTS

Hereinafter, an embodiment of the air-conditioning system according to the present invention will be described with reference to drawings. Note that the embodiment to be described below does not limit the present invention. Also, including FIG. 1, relations between sizes of respective components in the following figures are different from those in actuality in some cases.

Embodiment

Figure 1:
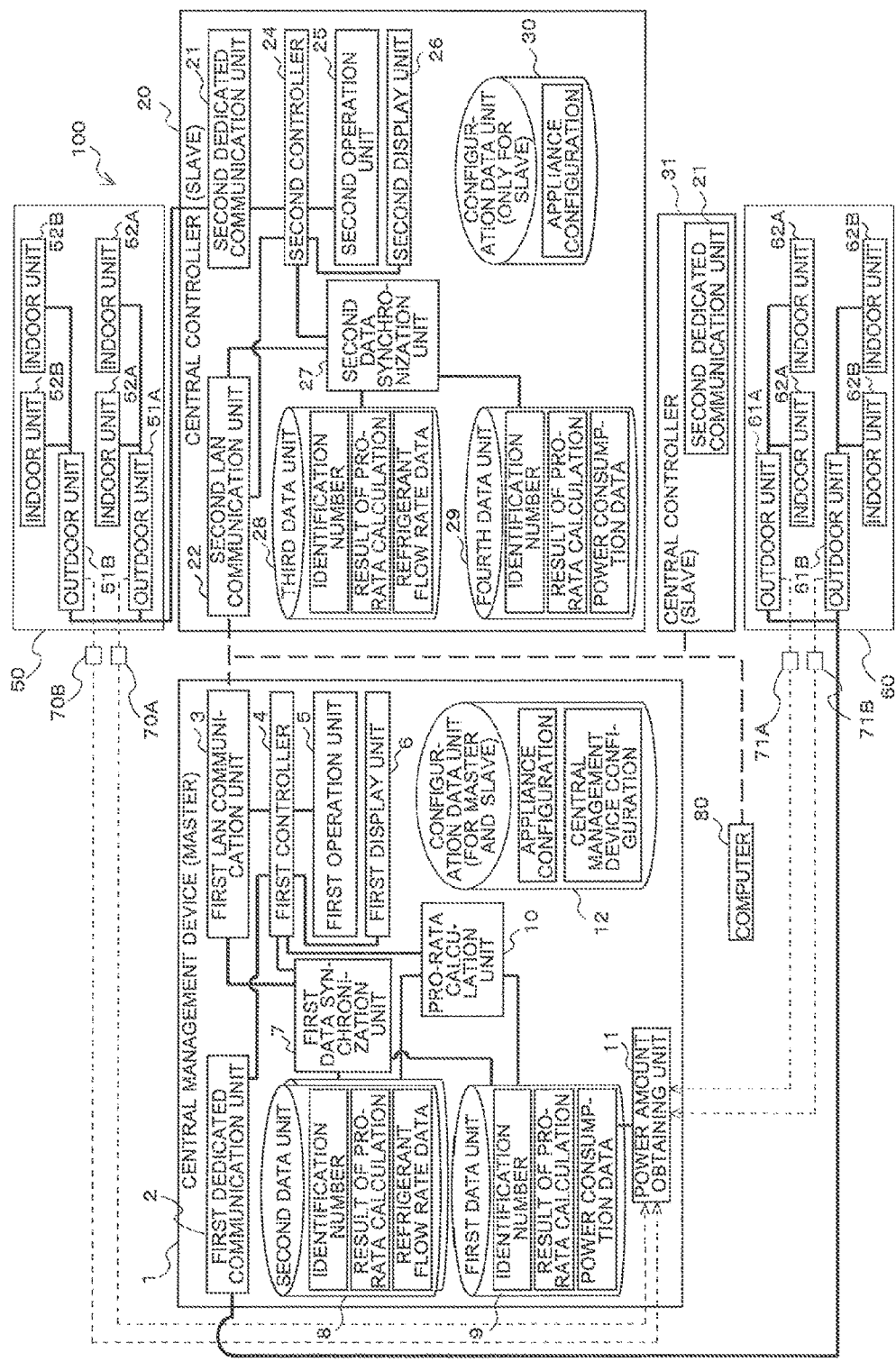
FIG. 1 is a general configuration example view of an air-conditioning system 100 according to Embodiment of the present invention.
Figure 2A:
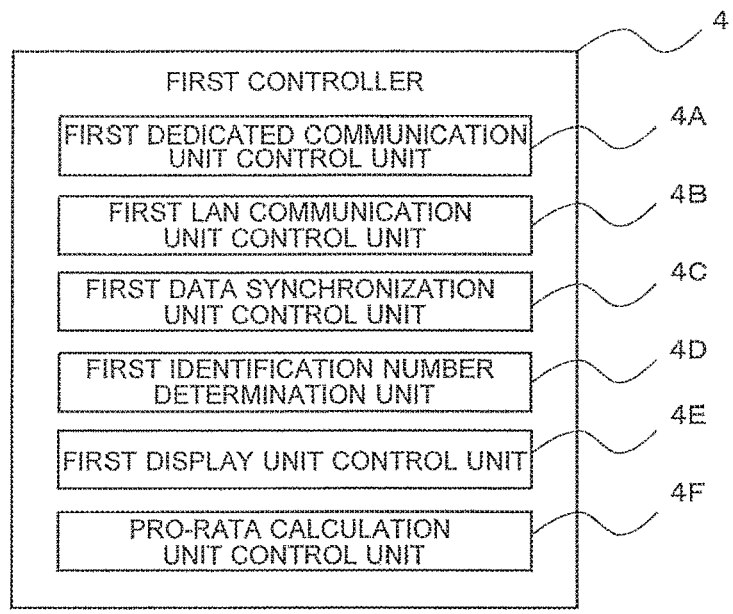
FIG. 2A is a block diagram illustrating a configuration example of a first controller 4.
Figure 2B:
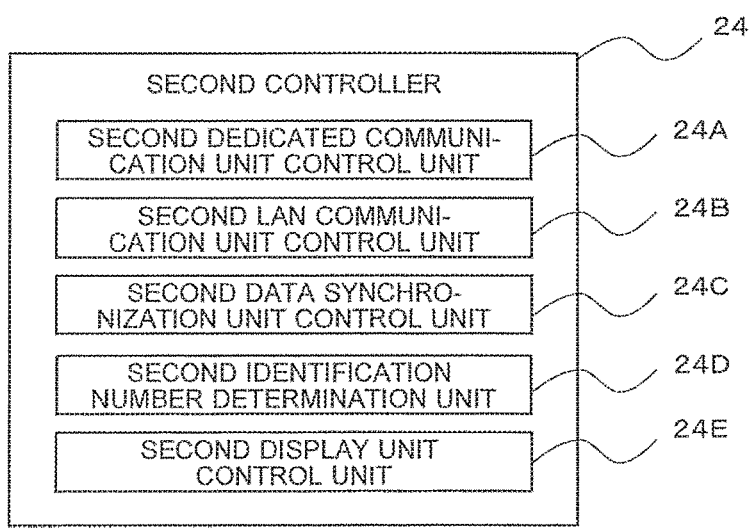
FIG. 2B is a block diagram illustrating a configuration example of a second controller 24.

FIG. 1 is a general configuration example view of an air-conditioning system 100 according to Embodiment. FIG. 2A is a block diagram illustrating a configuration example of a first controller 4. FIG. 2B is a block diagram illustrating a configuration example of a second controller 24. With reference to FIGS. 1, 2A and 2B, the configuration and other factors of the air-conditioning system 100 will be described.

[Description of Configuration]

The air-conditioning system 100 includes a central controller 20 that controls a refrigeration cycle device 50, a central controller 31 that controls a refrigeration cycle device 60 and a central management device 1 that exercises integrated control of the central controller 20 and the central controller 31. Note that, in each figure, the central management device 1 is depicted as a master unit, and the central controller 20 and the central controller 31 are depicted as slave units.

Note that the refrigeration cycle device 50 and the refrigeration cycle device 60 each correspond to, for example, a refrigeration device such as an air-conditioning apparatus and a refrigerator. In Embodiment, as an example, a case in which the refrigeration cycle device 50 and the refrigeration cycle device 60 are air-conditioning apparatuses will be described. The refrigeration cycle device 50 includes an outdoor unit 51A and an outdoor unit 51B each including a compressor, an expansion device, an outdoor heat exchanger and an outdoor fan, which are unillustrated, and indoor units 52A and indoor units 52B each including an indoor heat exchanger and an indoor fan, which are unillustrated. Similar to the refrigeration cycle device 50, the refrigeration cycle device 60 also includes an outdoor unit 61A and an outdoor unit 61B, and indoor units 62A and indoor units 62B. Here, the outdoor unit 51A and the indoor units 52A are connected by a refrigerant pipe, the outdoor unit 51B and the indoor units 52B are connected by a refrigerant pipe, the outdoor unit 61A and the indoor units 62A are connected by a refrigerant pipe, and the outdoor unit 61B and the indoor units 62B are connected by a refrigerant pipe, and thereby, each constitutes an independent refrigerant circuit.

To the outdoor unit 51A, the outdoor unit 51B, the outdoor unit 61A, and the outdoor unit 61B, a power consumption meter 70A, a power consumption meter 70B, a power consumption meter 71A, and a power consumption meter 71B are attached, respectively, each power consumption meter being used for measuring power consumption of each outdoor unit. Data of the power consumption meter 70A, the power consumption meter 70B, the power consumption meter 71A, and the power consumption meter 71B is output to a power amount obtaining unit 11 of the central management device 1, which will be described later. In this manner, in the air-conditioning system 100, power consumption in each of one or more outdoor units (the outdoor unit 51A, the outdoor unit 51B, the outdoor unit 61A, and the outdoor unit 61B) is obtained and operation data of the refrigeration cycle device 50 and the refrigeration cycle device 60 collected on the central controller 20 and central controller 31 side is obtained on the central management device 1 side, and accordingly, preset pro-rata calculation is performed. Consequently, power consumption in each indoor unit can be calculated. For example, when the air-conditioning system 100 is a multi-air-conditioning apparatus for a building and the user is different from floor to floor in a building, a charge corresponding to power consumption can be imposed on each user using an indoor unit on each floor.

(Central Management Device 1)

The central management device 1 is communicably connected to two central controllers 20 and 31, and an external operation terminal 80 with which various pieces of data are exchanged. The central management device 1 exercises integrated control of the central controller 20 and the central controller 31, which are the slave units, and has a configuration corresponding to a master unit of these slave units.

The central management device 1 includes a first dedicated communication unit 2 used for communicating with the refrigeration cycle device 60 and control the refrigeration cycle device 60, and a first LAN communication unit 3 used for communicating with the central controller 20, the central controller 31 and other devices.

Also, the central management device 1 includes a first controller 4 that controls various components, a first operation unit 5 that is operated by a user, a manager, or other personnel, a first display unit 6 for displaying information, such as information preset for a user, a manager, or other personnel, and a first data synchronization unit 7 used for synchronizing data when the data is output between the central controller 20 and the central controller 20.

Also, the central management device 1 includes a first data unit 9 that stores data, such as identification number data corresponding to an identification number set to the central management device 1 (first identification number data), and a second data unit 8 that stores data, such as identification number data corresponding to identification numbers set to the central controller 20 and the central controller 31, which are the slave units (second identification number data). The central management device 1 has, not only the data directly output to the central management device 1, but also the data collected by the central controller 20 and the data collected by the central controller 31, and backs up the data, Further, the central management device 1 includes a power amount obtaining unit 11 that obtains power consumption data of the outdoor unit 61A of the refrigeration cycle device 50 and other devices, and a pro-rata calculation unit 10 that performs pro-rata calculation on the basis of, for example, power consumption data of the power amount obtaining unit 11 and operation data of the central controller 20 and the central controller 31 stored in the second data unit 8.

The first dedicated communication unit 2 is provided to enable the central management device 1 side to control the refrigeration cycle device 60. The first dedicated communication unit 2 includes a communication circuit in the central management device 1, the communication circuit being used to communicate with the refrigeration cycle device 50. The first LAN communication unit 3 includes a communication circuit used by the central management device 1 to communicate with the central controller 20, the central controller 31 and the external operation terminal 80. Further, the refrigeration cycle device 50 and the refrigeration cycle device 60 can be indirectly controlled from the central management device 1 side. For example, in the air-conditioning system 100, the refrigeration cycle device 50 is not only controlled by the central controller 20 but can also be controlled from the central management device 1 side.

The first controller 4 issues predetermined commands to various components, and performs various computations, The first controller 4 exchanges data with the first dedicated communication unit 2, the first LAN communication unit 3, the first operation unit 5, the first display unit 6, the first data synchronization unit 7, the pro-rata calculation unit 10, and other devices. The first controller 4 includes a first dedicated communication unit control unit 4A that controls the first dedicated communication unit 2, a first LAN communication unit control unit 4B that controls the first LAN communication unit 3, a first data synchronization unit control unit 4C that controls the first data synchronization unit 7, a first identification number determination unit 4D that determines about the identification number, a first display unit control unit 4E that controls the first display unit 6, and a pro-rata calculation unit control unit 4F that controls the pro-rata calculation unit 10. The first dedicated communication unit control unit 4A, the first LAN communication unit control unit 4B, the first data synchronization unit control unit 4C, the first identification number determination unit 4D, the first display unit control unit 4E, and the pro-rata calculation unit control unit 4F can be configured by, for example, various circuits.

The first operation unit 5 includes a configuration corresponding to, for example, buttons, a touch panel, and other components operated by a user, a manager, or other personnel. Operation of the first operation unit 5 by a user or a manager can operate and stop the refrigeration cycle device 50 or other devices, and perform synchronization (duplication) of data by conducting communication between the central management device 1 and the central controllers 20 and 31.

The first display unit 6 corresponds to, for example, a display screen of liquid crystal. For example, operation status of the refrigeration cycle device 50 and other devices, and communication status between the central management device 1 and the central controllers 20 and 31 are displayed.

The first data synchronization unit 7 is used for synchronizing a transfer rate by use of clock signals on the transmitting side and the receiving side, to thereby exchange data between the central controller 20 and the central controller 31. Here, one of the central management device 1 and the central controllers 20 and 31 is the transmitting side, and the other is the receiving side. For example, the first data synchronization unit 7 is able to synchronize the transfer rate by use of the clock signals, and to sequentially output data to a side of a second data synchronization unit 27, which will be described later. The first data synchronization unit 7 can be configured with, for example, a synchronization circuit or other devices.

The first data unit 9 stores the power consumption data, results of the pro-rata calculation or other information. In more detail, the first data unit 9 stores data such as (1) first identification number data corresponding to the first identification number set for the central management device 1, which is the master unit, (2) data corresponding to a result of pro-rata calculation performed by the pro-rata calculation unit 10, and (3) power consumption data corresponding to the power consumption of the outdoor unit 51A, the outdoor unit 51B, the outdoor unit 61A, and the outdoor unit 61B.

Also, the data stored in the first data unit 9 is stored in a fourth data unit 29 held by the central controller 20 and the central controller 31, which are the slave units, and thereby data on the master unit side is backed up.

The second data unit 8 stores data such as operation data output from each central controller (the central controller 20 and the central controller 31). In other words, the second data unit 8 stores data such as the operation data collected by the central controller 20 and the operation data collected by the central controller 31, to thereby back up data on the slave unit side. The term operation data on the slave unit side means data such as the identification number data (the second identification number data) held by each central controller (the central controller 20 and the central controller 31), data of the results of the pro-rata calculation performed by the pro-rata calculation unit 10, and refrigerant flow rate data used in the pro-rata calculation.

The backed-up operation data is output to a central controller that is newly placed when, for example, any one of the central controller 20 and the central controller 31 is out of order and is replaced. Also, the backed-up data is output to the central controller 20 and the central controller 31 when, for example, the data stored in the central controller 20 and the central controller 31 has been lost. In this manner, the second data unit 8 has a function to back up data on the slave unit side.

Also, the second data unit 8 has not only the data backup function, but also has a function to store data used for the pro-rata calculation performed in the pro-rata calculation unit 10. In other words, because the pro-rata calculation is to calculate power consumption in each of the outdoor unit 51A, the outdoor unit 51B, the outdoor unit 61A, and the outdoor unit 61B, operation data in each of the outdoor unit 51A, the outdoor unit 51B, the outdoor unit 61A, and the outdoor unit 61B is required.

The first data unit 9 and the second data unit 8 can be configured with, for example, a storage medium, such as a hard disk, or can be configured with a storage medium, such as a flash memory.

The power amount obtaining unit 11 is connected to the power consumption meter 70A, the power consumption meter 70B, the power consumption meter 71A, and the power consumption meter 71B, to thereby obtain power consumption in the outdoor unit 51A, the outdoor unit 51B, the outdoor unit 61A, and the outdoor unit 61B. The power amount obtaining unit 11 stores the obtained power consumption data in the first data unit 9. Note that, Embodiment describes that data of the power consumption meter 70A and other meters is output to the power amount obtaining unit 11; however, the present invention is not limited to Embodiment. For example, the power amount obtaining unit 11 may not be provided. In this case, a manager or other personnel may read the power consumption value of the power consumption meter 70A or other meters, and input the power consumption value via the first operation unit 5.

The pro-rata calculation unit 10 performs a preset pro-rata calculation on the basis of the operation data stored in the first data unit 9 (the power consumption data) and the operation data stored in the second data unit 8 and related to the refrigeration cycle device 50 and the refrigeration cycle device 60. Here, an example of the pro-rata calculation will be described. Here, the pro-rata calculation on the power consumption while the outdoor unit 51A is operated, namely, the pro-rata calculation on the power consumption excluding standby power consumption, will be described.

The central controller 20 has data of refrigerant flow rate flowing through the outdoor unit 51A per unit time and refrigerant flow rate flowing through one of the indoor units 52A per unit time. The data of refrigerant flow rate per unit time can be obtained in various manners, for example, placing a refrigerant flow meter in the refrigerant circuit for calculation. Here, description will be given by taking a case, in which the refrigerant flow rate data of one of the indoor units 52A is 22 (no unit), and the refrigerant flow rate data of the other of the indoor units 52A is 25, as an example. In this example, in the central controller 20, respective capacities of the two indoor units 52A are set. For example, a case is assumed where the capacity of one of the indoor units 52A is 5 kW and the capacity of the other of the indoor units 52A is 2 kW. In a third data unit 28 of the central controller 20, the data of the refrigerant flow rate and the data of capacities of the respective indoor units 52A are stored. Then, the data of the refrigerant flow rate and the data of capacities of the respective indoor units 52A are output to the second data unit 8 and stored.

The pro-rata calculation unit 10 multiplies the refrigerant flow rate data and the capacity of each of the indoor units 52A, to thereby calculate a pro-rata coefficient of the one and the other of the indoor units 52A. The pro-rata coefficient of one of the indoor units 52A is 22×5=110, and the pro-rata coefficient of the other of the indoor units 52A is 25×2=50.

On the other hand, in the first data unit 9 of the central management device 1, power consumption amount data obtained by the power amount obtaining unit 11 is stored. Here, a case is assumed where the numerical value of the power consumption amount is 1,000 Wh and the standby power consumption amount is 35 Wh. Note that the standby power consumption amount is assumed to be calculated by the pro-rata calculation unit 10 in advance. Consequently, the power consumption amount while the outdoor unit 51A is operated is 1,000−35=965 Wh.

The pro-rata calculation unit 10 multiplies the power consumption amount excluding the standby power consumption amount by each pro-rata coefficient, and divides by a total value of the pro-rata coefficients, and accordingly, the power consumption amount of each of the one and the other indoor units 52A can be calculated. Regarding to one of the indoor units 52A, 965×110/160=663.4 Wh, whereas, regarding to the other one of the indoor units 52A, 965×50/160=301.5 Wh. Thus, a manager is able to impose a usage charge on each of the user using one of the indoor units 52A and the user using the other one of the indoor units 52A on the basis of the power consumption of the one and the other of the indoor units 52A calculated by the pro-rata calculation unit 10.

(Central Controller 20 and Central Controller 31)

The central controller 20 includes a second dedicated communication unit 21 used for communicating with the refrigeration cycle device 50 and control the refrigeration cycle device 50, and a second LAN communication unit 23 used for communicating with the central management device 1 and other devices. The central controller 20 includes a second controller 24 that controls various components, a second operation unit 25 that is operated by a user, a manager, or other personnel, a second display unit 26 for displaying information such as information preset for a user, a manager, or other personnel, and a second data synchronization unit 27 used for synchronizing data when the data is output between the central management device 1.

The central controller 20 includes a third data unit 28 that stores data, such as identification number data corresponding to an identification number set to the central controller 20 (second identification number data), and a fourth data unit 29 that stores data, such as identification number data corresponding to the identification number set to the central management device 1, which is the master unit, and results (data) of the pro-rata calculation performed by the central management device 1. The central controller 20 has, not only the data directly output to the central controller 20, but also the data held by the central management device 1, which is the master unit, and backs up the data.

The second dedicated communication unit 21 and the second LAN communication unit 23 have configurations corresponding to those of the first dedicated communication unit 2 and the first LAN communication unit 3. In other words, the second dedicated communication unit 22 is provided to control the refrigeration cycle device 50. The second dedicated communication unit 21 includes a communication circuit, and other devices. The second LAN communication unit 23 includes a communication circuit or other components used by the central controller 20 to communicate with the central management device 1 and the external operation terminal 80.

Similar to the first controller 4, the second controller 24 issues predetermined commands to various components, and performs various computations. The second controller 24 exchanges data with the second dedicated communication unit 21, the second LAN communication unit 23, the second operation unit 25, the second display unit 26, the second data synchronization unit 27, and other devices. The second controller 24 includes a second communication unit control unit 24A that controls the second dedicated communication unit 21, a second LAN communication unit control unit 24B that controls the second LAN communication unit 23, a second data synchronization unit control unit 24C that controls the second data synchronization unit 27, a second identification number determination unit 240 that determines about the identification number, and a second display unit control unit 24E that controls the second display unit 26. The second communication unit control unit 24A, the second LAN communication unit control unit 24B, the second data synchronization unit control unit 240, the second identification number determination unit 24D, and the second display unit control unit 24E can be configured by, for example, various circuits.

The second operation unit 25, the second display unit 26, and the second data synchronization unit 27 have configurations corresponding to those of the first operation unit 5, the first display unit 6, and the first data synchronization unit 7. In other words, the second operation unit 25 includes a configuration corresponding to, for example, buttons, a touch panel, and other components operated by a user, a manager, or other personnel. The second display unit 26 includes a configuration corresponding to, for example, a display screen of liquid crystal. Further, the second data synchronization unit 27 is configured with, for example, a synchronization circuit that synchronizes the transfer rate by use of the clock signals, and sequentially outputs data to a side of a second data synchronization unit 27, which will be described later.

The third data unit 28 stores operation data related to the refrigeration cycle device 50. In more detail, the third data unit 28 stores data such as (1) second identification number data corresponding to the second identification number set for the central controller 20, which is the slave unit, (2) data corresponding to a result of pro-rata calculation performed by the pro-rata calculation unit 10, and (3) refrigerant flow rate data of the indoor units 52A and the indoor units 52B.

The fourth data unit 29 stores, for example, the operation data stored in the fourth data unit 29 of the central management device 1. In other words, the fourth data unit 29 stores the operation data, such as the identification number data of the central management device 1, to thereby back up the data on the master unit side. The term operation data on the master unit side means data such as the identification number data held by the central management device 1 (the first identification number data), the data of the results of the pro-rata calculation performed by the pro-rata calculation unit 10, and the power consumption data used in the pro-rata calculation.

The backed-up operation data is output to a central management device 1 that is newly placed when, for example, the central management device 1 is out of order and is replaced. The backed-up data is output to the central management device 1 when, for example, the data stored in the central management device 1 has been lost. In this manner, the fourth data unit 29 has a function to back up data on the master unit side.

As described above, the central management device 1 and each central controller (the central controller 20 and the central controller 31) are configured to output the operation data stored in the third data unit 28 to the second data unit 8 and to output the operation data, such as the results of pro-rata calculation, stored in the first data unit 9, to the fourth data unit 29, to thereby perform duplication of the data.

Note that, although description will be omitted, the central controller 31 also has a configuration similar to that of the central controller 20. In other words, the central controller 31 includes the second dedicated communication unit 21, the second LAN communication unit 23, the second controller 24, the second operation unit 25, the second display unit 26, the second data synchronization unit 27, the third data unit 28, and the fourth data unit 29. Although illustration is omitted, the second dedicated communication unit 21 in the central controller 31 is connected to a refrigeration cycle device that is different from the refrigeration cycle device 50 and the refrigeration cycle device 60 and is able to control the refrigeration cycle device.

[Regarding to Duplication of Data and Pro-Rata Calculation]

Figure 3A:
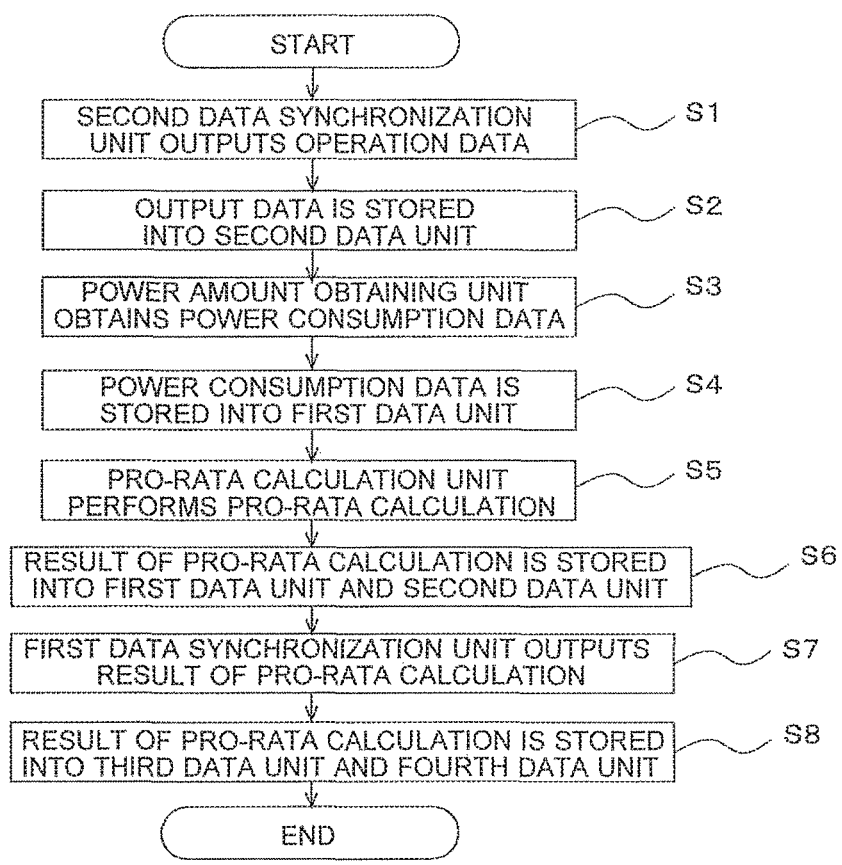
FIG. 3A is a flowchart illustrating an example of an operation flow when data is duplicated in a central management device 1 and a central controller 20 in the air-conditioning system 100 according to Embodiment.
Figure 3B:
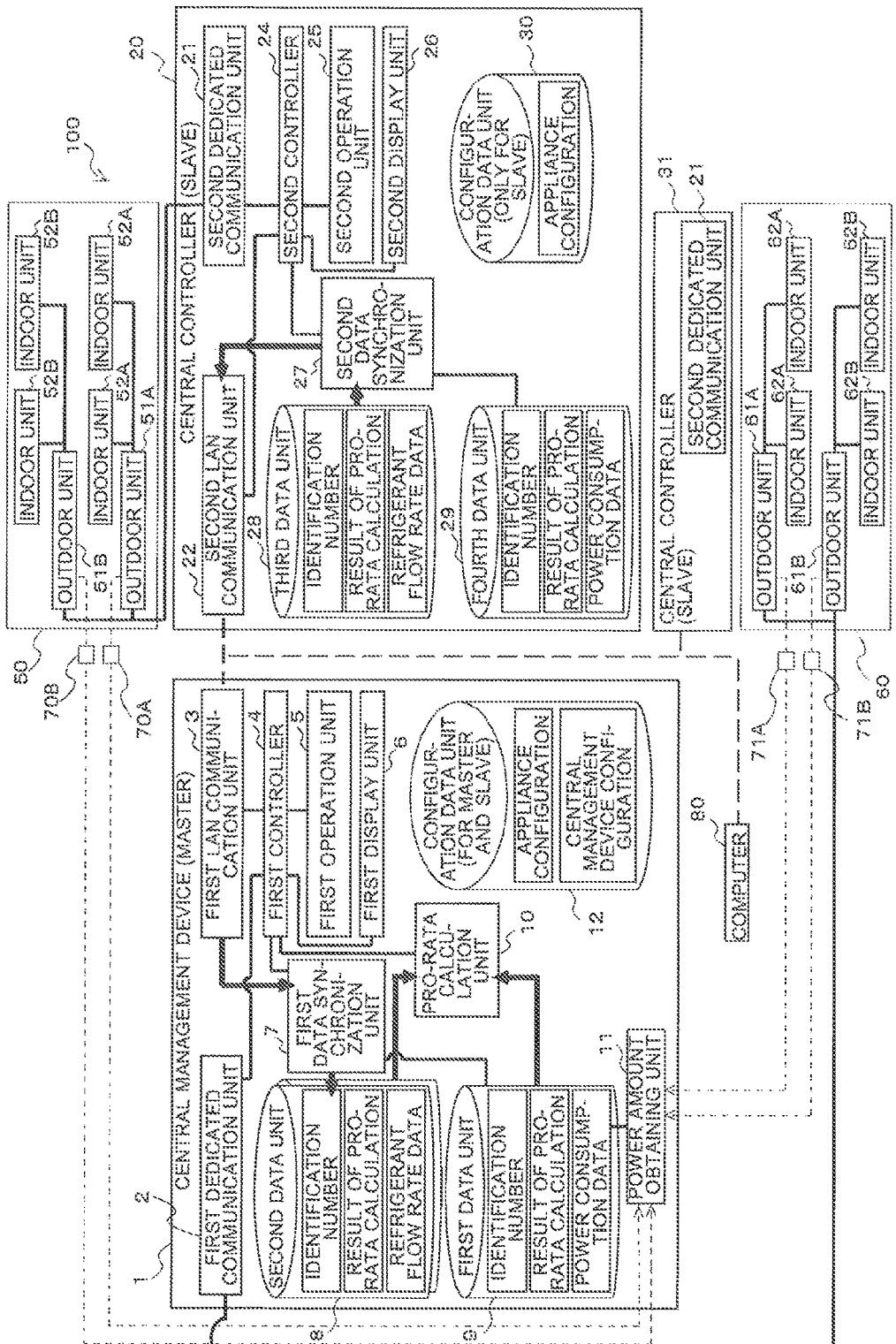
FIG. 3B is a diagram illustrating a state in which data is output from the central controller 20 side to the central management device 1 side and pro-rata calculation is performed in a pro-rata calculation unit 10.
Figure 3C:
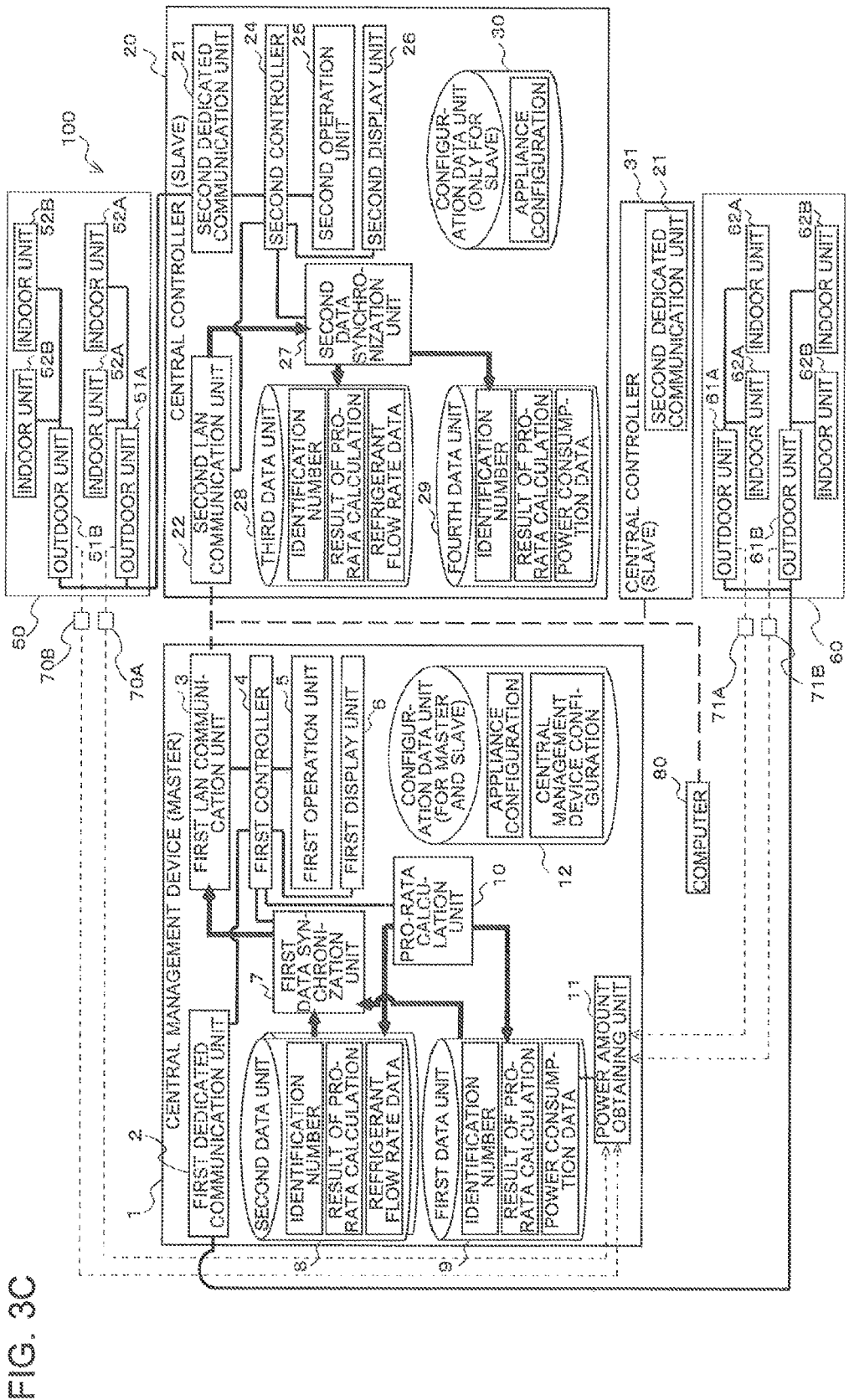
FIG. 3C is a diagram illustrating a state in which results of the pro-rata calculation are stored in a first data unit 9 and a second data unit 8, and then the data is output from the central management device 1 side to the central controller 20 side.

FIG. 3A is a flowchart illustrating an example of an operation flow when data is duplicated in the central management device 1 and the central controller 20 in the air-conditioning system 100 according to Embodiment. FIG. 3B is a diagram illustrating a state in which data is output from the central controller 20 side to the central management device 1 side and pro-rata calculation is performed in the pro-rata calculation unit 10. FIG. 3C is a diagram illustrating a state in which results of the pro-rata calculation are stored in the first data unit 9 and the second data unit 8, and then the data is output from the central management device 1 side to the central controller 20 side. Note that, for convenience of description, in FIGS. 3A to 3C, a state is shown in which the central controller 31 does not exchange data with the central management device 1, but only the central controller 20 exchanges data with the central management device 1.

As shown in FIGS. 3A and 3B, the second data synchronization unit 27 transfers (outputs) the operation data stored in the third data unit 28 to the first data synchronization unit 7. The data is output to the first data synchronization unit 7 via the second LAN communication unit 23 and the first LAN communication unit 3 (step S1). In the second data unit 8, the data output to the first data synchronization unit 7 is stored (step S2).

The power amount obtaining unit 11 obtains power consumption data of the outdoor unit 51A or other units (step S3). In the first data unit 9, the power consumption data output from the power amount obtaining unit 11 is stored (step S4).

The pro-rata calculation unit 10 performs pro-rata calculation on the basis of the power consumption data in the first data unit 9 and the operation data (the refrigerant flow rate data) in the second data unit 8 (step S5).

As shown in FIGS. 3A and 3C, the pro-rata calculation unit 10 stores the data of the results of the pro-rata calculation in the first data unit 9 and the second data unit 8 (step S6). The first data synchronization unit 7 transfers (outputs) the operation data stored in the second data unit 8 to the second data synchronization unit 27. The data is output to the second data synchronization unit 27 via the first LAN communication unit 3 and the second LAN communication unit 23 (step S7). In the fourth data unit 29, the data output to the second data synchronization unit 27 is stored (step S8). The air-conditioning system 100 performs duplication (synchronization) of data by the operations in steps S1, S2 and S6 to S8, and performs the pro-rata calculation in step S5.

[Regarding to Restoration of Data]

Figure 4A:
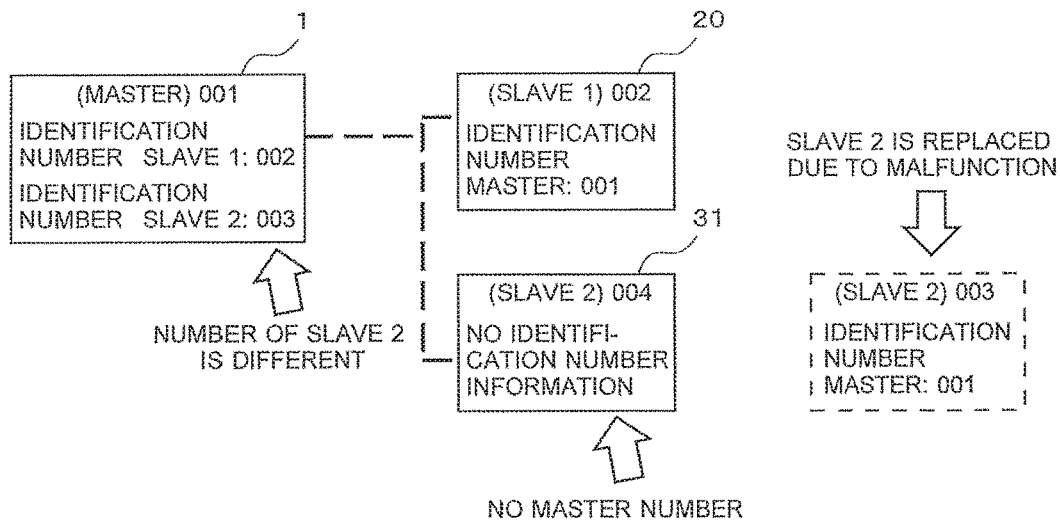
FIG. 4A is a schematic view illustrating a state in which, when a central controller 31 in the air-conditioning system 100 is replaced, data is restored to the newly placed central controller 31.

FIG. 4A is a schematic view illustrating a state in which, when the central controller 31 in the air-conditioning system 100 is replaced, data is restored to the newly placed central controller 31. With reference to FIG. 4A and FIGS. 1 and 2 described above, a manner to restore data will be described. As shown in FIG. 4A, the central controller 31 is replaced with a new one due to malfunction or other reasons.

The central management device 1 has the first identification number data that is stored in the first data unit 9 and is used to identify whether or not the central management device 1 corresponds to the central controller 20 and the central controller 31. The first identification number data includes the identification number of the central management device 1 (001), the identification number of the central controller 20 (002) and the identification number of the central controller 31 (003), Each central controller has the second identification number data that is stored in the third data unit 28 and is compared with the first identification number data. The second identification number data includes the identification number of each central controller and the identification number of the central management device 1, which is the master unit. Here, the new central controller 31 has no identification number (for example, the identification number 000).

The central management device 1 is configured to output data, among the results of the pro-rata calculation stored in the first data unit 9 and the operation data stored in the second data unit 8, the data corresponding to the central controller 31, to the central controller 31 having the second identification number data different from the first identification number data, to thereby restore the data. In more detail, as the second identification number data of the central controller 31 does not include the identification number of the master unit, the central controller 31 can be determined to be newly replaced. Consequently, the central management device 1 outputs the data, among the results of the pro-rata calculation stored in the first data unit 9 and the operation data stored in the second data unit 8, the data corresponding to the central controller 31, to the central controller 31. The output data is stored in the third data unit 28 and the fourth data unit 29 of the central controller 31.

Figure 4B:
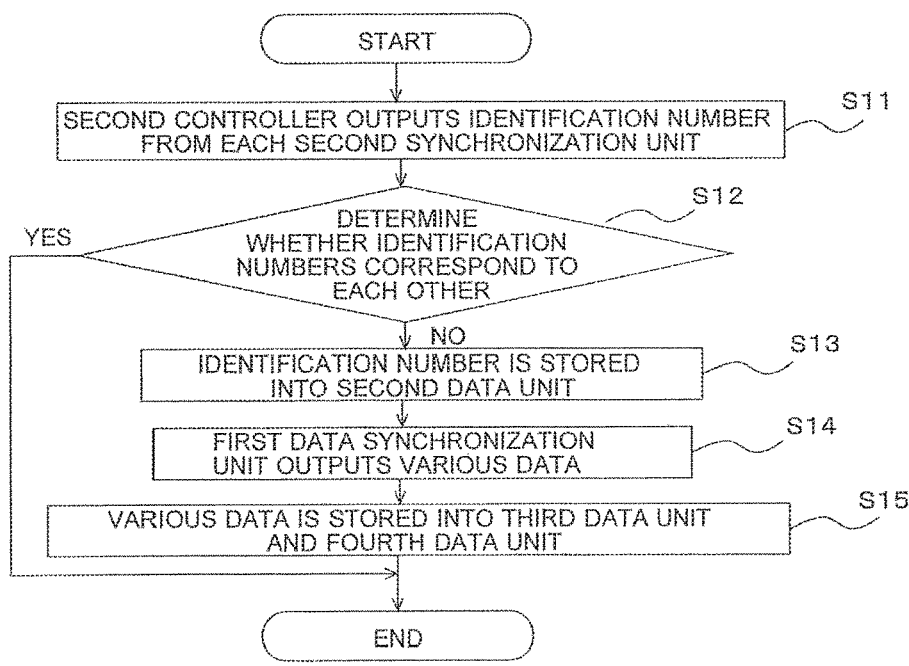
FIG. 4B is an example of a flowchart to output the data from the central management device 1 side to the central controller 31 side to restore the data.
Figure 4C:
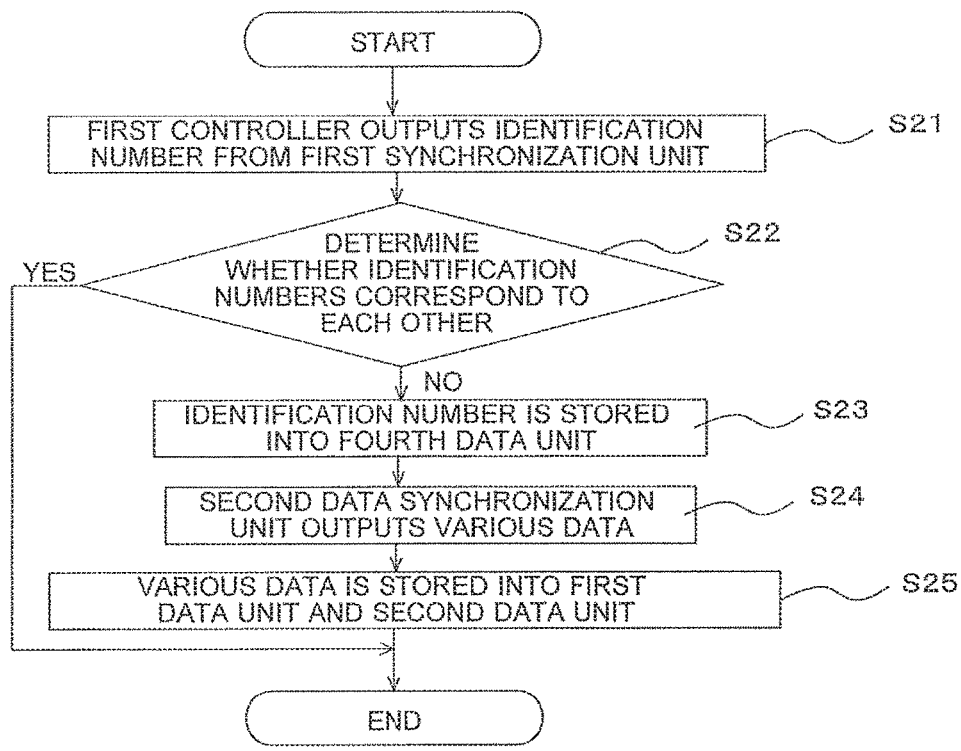
FIG. 4C is an example of a flowchart to output the data from the central controller 20 or central controller 31 side to the central management device 1 side to restore the data.

FIG. 4B is an example of a flowchart to output the data from the central management device 1 side to the central controller 31 side to restore the data. As shown in FIG. 4A, here, the operation when the central controller 31 is replaced will be described. The second controller 24 outputs the second identification number data stored in the third data unit 28 to the first data synchronization unit 7 side (step S11). The first identification number determination unit 4D of the first controller 4 compares the first identification number data with the second identification number data (step S12). In the description here, as shown in FIG. 4A, the first identification number data is assigned with 001 as the identification number of the master unit, whereas, the second identification number data does not have data of the master unit. As the data items of both sides do not correspond to each other, the process proceeds to step S13. In the second data unit 8, the second identification number data is stored (step S13). The first data synchronization unit control unit 4C of the first controller 4 controls the first data synchronization unit 7, to thereby output the data stored in the first data unit 9 and the data stored in the second data unit 8 to the central controller 31 (step S14). The central controller 31 stores the data output from the central management device 1 into the third data unit 28 and the fourth data unit 29 (step S15).

FIG. 40 is an example of a flowchart to output the data from the central controller 20 or central controller 31 side to the central management device 1 side to restore the data. In FIG. 40, a case is assumed where the central management device 1 is replaced.

The first controller 4 outputs the first identification number data stored in the first data unit 9 to the second data synchronization unit 27 side (step S21). The second identification number determination unit 24D of the second controller 24 compares the first identification number data with the second identification number data (step S22). Here, the first identification number data, which is the data of the master unit side, is not assigned with the identification number of the slave unit side. As the data items of both sides do not correspond to each other, the process proceeds to step S23. In the fourth data unit 29, the first identification number data is stored (step S23). The second data synchronization unit control unit 240 of the second controller 24 controls the second data synchronization unit control unit 240, to thereby output the data stored in the third data unit 28 and the data stored in the fourth data unit 29 to the central management device 1 (step S24). The central management device 1 stores the data output from the central controller 20 into the first data unit 9 and the second data unit 8 (step S25).

[Invalidation of First Dedicated Communication Unit 2]

The central management device 1 is configured to invalidate the communication between each of the central controllers and the refrigeration cycle device 60 via the first dedicated communication unit 2 when duplication is performed or the pro-rata calculation is performed. The operation of duplication or the operation of the pro-rata calculation increases the loads on the various circuits in the central management device 1. To solve the problem, when the operation of duplication or the pro-rata calculation is performed, the first dedicated communication unit control unit 4A of the first controller 4 controls the first dedicated communication unit 2 to invalidate the communication between the first dedicated communication unit 2 and the refrigeration cycle device 60. Consequently, the central management device 1 can more smoothly operate the duplication and the pro-rata calculation.

[Regarding to External Operation Terminal 80]

The external operation terminal 80 is communicably connected to the central management device 1 and each central controller. The external operation terminal 80 can be configured with, for example, a computer or other devices. When data of at least one of the central management device 1 and each central controller is altered, the central management device 1 and each central controller perform duplication on the basis of the data held in the external operation terminal 80. Performing this duplication can shorten a period during which the data of the first data unit 9 and the data of the fourth data unit 29 where the data for backup is stored are different and a period during which the data of the third data unit 28 and the data of the second data unit 8 where the data for backup is stored are different, to thereby improve reliability of the backup data.

[Effects of Air-Conditioning System 100 According to Embodiment]

In the air-conditioning system 100 according to Embodiment, the central management device 1 includes the first data unit 9 and the second data unit 8 for backup of each central controller, and each central controller includes the third data unit and the fourth data unit 29 for backup of the central management device 1. For example, even when any one of the central management device 1 and each central controller is changed, data can be restored to the newly replaced one. Consequently, for example, when, in the air-conditioning system 100, a charge is imposed on the basis of power consumption, convenience is prevented from being impaired due to incapability of charging to users.

Note that, Embodiment provides an example in which the central controller 20 and the central controller 31 are connected to the central management device 1; however, the present invention is not limited to the example, and the number of the central controllers may be one or three or more.

Embodiment describes that the pro-rata calculation unit 10 performs the pro-rata calculation on the basis of the power consumption data and the refrigerant flow rate data; however, the present invention is not limited to the description, For example, instead of the refrigerant flow rate data, data of thermo-on time (time in which refrigerant is flown through the indoor unit) can be used, or data of fan-operation time for the indoor unit can also be used. The data to be used can be determined appropriately to required accuracy of the pro-rata calculation.

Embodiment provides an example in which the power amount obtaining unit 11 exists in the central management device 1; however, the present invention is not limited to the example, and the power amount obtaining unit 11 may exist in the central controller 20, or, a power consumption measuring appliance existing on a dedicated communication line or LAN may obtain the power amount. In this case, the power amount data is collected in the central management device 1 via the dedicated communication unit or LAN.

Embodiment provides an example in which the power consumption meter is connected to the outdoor unit to prorate the power consumption of the outdoor unit; however, the power consumption meter may be connected to the indoor unit to prorate the power consumption of the indoor unit.

Embodiment provides an example in which the used power amount obtained by subtraction of the standby power consumption amount from the power consumption amount of the outdoor unit is prorated; however, the power consumption amount may be prorated, or the used power amount and the standby power consumption amount may be prorated individually.

[Modified Example]

Figure 5:
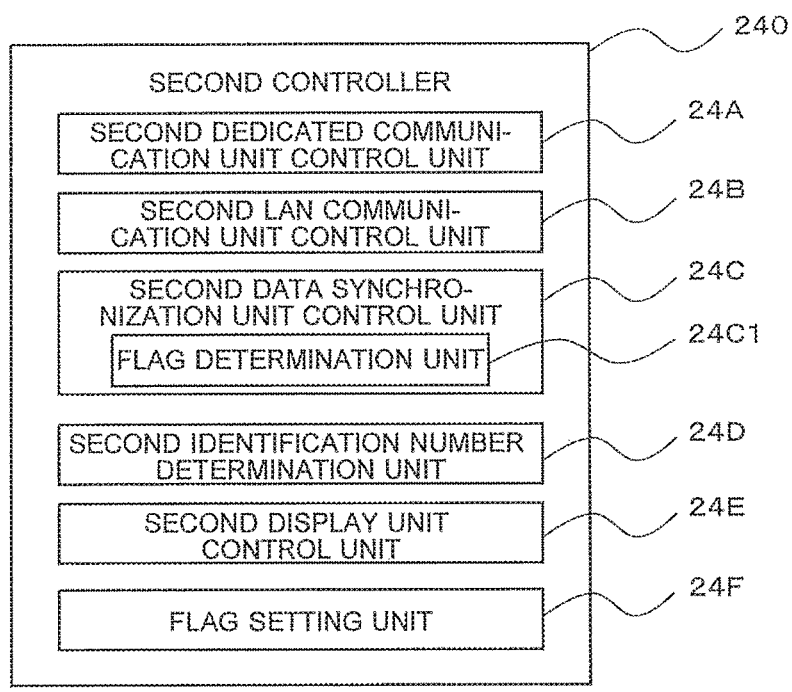
FIG. 5 is an illustration diagram about a configuration in which the second controller 240 includes a flag setting unit and flag determination unit 24C1.

FIG. 5 is an illustration diagram about a configuration in which the second controller 240 includes a flag setting unit 24F and a flag determination unit 24C1. Each central controller may be configured to set a flag when operation data stored in the third data unit 28 is corrected, and output the operation data, of the operation data stored in the third data unit 28, to which the flag has been set, to the second data unit 8. In other words, the second controller 240 of each central controller may include a flag setting unit 24F that sets a flag when operation data stored in the third data unit 28 is corrected. The second data synchronization unit control unit 240 may include a flag determination unit 2401 that outputs the operation data, of the operation data stored in the third data unit 28, to which the flag has been set, to the second data unit. By provision of the flag setting unit 24F and the flag determination unit 2401, all the data stored in the third data unit 28 is prevented from being transferred to the second data unit 8 when data duplication is performed, and thereby, increase of the data transfer amount is minimized.

Regarding the central management device 1, the first controller 4 may have a configuration corresponding to the flag setting unit 24F and the flag determination unit 24C1. In other words, the first controller 4 may include the flag setting unit that sets a flag when operation data, such as the results of the pro-rata calculation, stored in the first data unit 9 is corrected. The first data synchronization unit control unit 40 of the first controller 4 may include the flag determination unit that outputs the operation data, of the operation data stored in the first data unit 9, to which the flag has been set, to the fourth data unit 29.

REFERENCE SIGNS LIST

1 Central management device 2 First dedicated communication unit 3 First LAN communication unit 4 First controller 4A First dedicated communication unit control unit 4B First LAN communication unit control unit 40 First data synchronization unit control unit 4D First identification number determination unit

4E First display unit control unit 4F Pro-rata calculation unit control unit 5 First operation unit 6 First display unit 7 First data synchronization unit 8 Second data unit 9 First data unit 10 Pro-rata calculation unit 11 Power amount obtaining unit 20 Central controller 21 Second dedicated communication unit 22 Second dedicated communication unit 23 Second LAN communication unit 24 Second controller 24A Second communication unit control unit 24B Second LAN communication unit control unit 240 Second data synchronization unit control unit

24C1 Flag determination unit 24D Second identification number determination unit 24E Second display unit control unit 24F Flag setting unit 25 Second operation unit 26 Second display unit 27 Second data synchronization unit 28 Third data unit 29 Fourth data unit 31 Central controller 50 Refrigeration cycle device 51A Outdoor unit 51B Outdoor unit 52A Indoor unit

52B Indoor unit 60 Refrigeration cycle device 61A Outdoor unit 61B Outdoor unit 62A Indoor unit 62B Indoor unit 70A Power consumption meter

70B Power consumption meter 71A Power consumption meter 71B Power consumption meter 80 External operation terminal 100 Air-conditioning system

240 Second controller

The invention claimed is:

1. An air-conditioning system comprising:
a plurality of central controllers each configured to control a refrigeration cycle device and receive power consumption data of the refrigeration cycle device; and
a central management device configured to
perform pro-rata calculation using power consumption data of the refrigeration cycle device input directly from the refrigeration cycle device, and
manage the plurality of central controllers,
the central management device including
a first data unit configured to store the power consumption data and a result of the pro-rata calculation, and
a second data unit configured to store data output from each of the plurality of central controllers,
each of the plurality of central controllers including
a third data unit configured to store operation data of the refrigeration cycle device, and
a fourth data unit configured to store data of the first data unit output from the central management device,
the central management device including first identification number data stored in the first data unit, the first identification number data being used to identify whether or not the central management device corresponds to each of the plurality of central controllers, and
each of the plurality of central controllers including second identification number data stored in the third data unit, the second identification number data being compared with the first identification number data.

2. The air-conditioning system of claim 1, wherein
the central management device and each of the plurality of central controllers are configured
to output data stored in the third data unit to the second data unit, and
to output data stored in the first data unit to the fourth data unit, to thereby perform duplication of data.

3. The air-conditioning system of claim 2, wherein
the central management device includes a dedicated communication unit used to control the refrigeration cycle device, and
the central management device is configured to, while the duplication is being performed or the pro-rata calculation is being performed, invalidate communication via the dedicated communication unit.

4. The air-conditioning system of claim 2, further comprising
an external operation terminal communicably connected to the central management device and each of the plurality of central controllers, wherein
the central management device and each of the plurality of central controllers are configured to perform the duplication when data of at least one of the central management device and each of the plurality of central controllers is altered on a basis of data held in the external operation terminal.

5. The air-conditioning system of claim 1, wherein
the central management device is configured to output, to at least one of the plurality of central controllers having the second identification number data different from the first identification number data, data corresponding to the at least one of the plurality of central controllers, among data stored in the first data unit and data stored in the second data unit, to thereby perform data restoration.

6. The air-conditioning system of claim 1, wherein
at least one of the plurality of central controllers is configured to output, when the first identification number data is different from the second identification number data, data stored in the third data unit and data stored in the fourth data unit to the central management device, to thereby perform data restoration.

7. The air-conditioning system of claim 5, wherein
the data restoration is performed when the first identification number data and the second identification number data are different due to replacement of the central management device or at least one of the plurality of central controllers.

8. The air-conditioning system of claim 1, wherein
the central management device is configured to perform the pro-rata calculation when the first identification number data and the second identification number data of each of the plurality of central controllers correspond to each other.

9. The air-conditioning system of claim 1, wherein the central management device or each of the plurality of central controllers is configured to set a flag when data stored in a corresponding one of the first data unit and the third data unit is corrected, and to duplicate data, to which the flag is set, among data stored in the first data unit and the third data unit.

10. An air-conditioning system comprising:

a plurality of central controllers each configured to control a refrigeration cycle device and receive power consumption data of the refrigeration cycle device; and a central management device configured to perform pro-rata calculation using power consumption data of the refrigeration cycle device input directly from the refrigeration cycle device, and manage the plurality of central controllers, the central management device including
a first data unit configured to store the power consumption data and a result of the pro-rata calculation, and
a second data unit configured to store data output from each of the plurality of central controllers, each of the plurality of central controllers including
a third data unit configured to store operation data of the refrigeration cycle device, and
a fourth data unit configured to store data of the first data unit output from the central management device, and the central management device or each of the plurality of central controllers being configured
to set a flag when data stored in a corresponding one of the first data unit and the third data unit is corrected, and
to duplicate data, to which the flag is set, among data stored in the first data unit and the third data unit.

* * * * *